US010057799B2

(12) United States Patent
Rao et al.

(10) Patent No.: US 10,057,799 B2
(45) Date of Patent: Aug. 21, 2018

(54) CHANNEL MEASUREMENT METHOD, CHANNEL MEASUREMENT APPARATUS, USER EQUIPMENT, AND SYSTEM

(71) Applicant: Huawei Technologies Co., Ltd., Shenzhen, Guangdong (CN)

(72) Inventors: Xiongbin Rao, Shenzhen (CN); Kin Nang Lau, Hong Kong (HK); Xiangming Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 15/338,141

(22) Filed: Oct. 28, 2016

(65) Prior Publication Data

US 2017/0048735 A1    Feb. 16, 2017

Related U.S. Application Data

(63) Continuation of application No. PCT/CN2014/076591, filed on Apr. 30, 2014.

(51) Int. Cl.
*H04L 12/26* (2006.01)
*H04W 24/08* (2009.01)
(Continued)

(52) U.S. Cl.
CPC .......... *H04W 24/08* (2013.01); *H04B 7/0421* (2013.01); *H04B 17/309* (2015.01);
(Continued)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS

2004/0264585 A1   12/2004  Borran et al.
2012/0076179 A1    3/2012  Stacey et al.
(Continued)

FOREIGN PATENT DOCUMENTS

CN   101257367 A   9/2008
CN   102594491 A   7/2012
(Continued)

OTHER PUBLICATIONS

Bajwa, W., et al, "Compressed Channel Sensing: A New Approach to Estimating Sparse Multipath Channels," Proceedings of the IEEE, vol. 98, No. 6, Jun. 2010, pp. 1058-1076.
(Continued)

*Primary Examiner* — Siren Wei

(57) ABSTRACT

The present invention provides a channel measurement method, a channel measurement apparatus, user equipment. A wireless communications system includes a channel measurement apparatus and at least two user equipments. The method includes: sending, by the channel measurement apparatus, an antenna domain training sequence to the at least two user equipments; receiving, by the channel measurement apparatus, channel response measurement sequences sent by the at least two user equipments, where the channel response measurement sequences are sequences that are obtained after the antenna domain training sequence passes through channels and that are received by the at least two user equipments; and performing, by the channel measurement apparatus, joint processing on the received channel response measurement sequences of the at least two user equipments to obtain downlink channel state information CSIT.

20 Claims, 4 Drawing Sheets

(51) Int. Cl.
| | |
|---|---|
| *H04W 40/12* | (2009.01) |
| *H04W 72/04* | (2009.01) |
| *H04L 5/00* | (2006.01) |
| *H04B 7/0417* | (2017.01) |
| *H04B 17/309* | (2015.01) |
| *H04W 88/08* | (2009.01) |

(52) U.S. Cl.
CPC ........... *H04L 5/0048* (2013.01); *H04W 40/12* (2013.01); *H04W 72/042* (2013.01); *H04W 88/08* (2013.01)

(56) References Cited

U.S. PATENT DOCUMENTS

| | | | |
|---|---|---|---|
| 2012/0314611 A1 | 12/2012 | Baker et al. | |
| 2013/0028068 A1 | 1/2013 | Park et al. | |
| 2013/0044028 A1* | 2/2013 | Lea | H01Q 21/24 342/359 |
| 2013/0077658 A1* | 3/2013 | Hui | H04B 7/0413 375/219 |
| 2013/0182594 A1* | 7/2013 | Kim | H04W 72/042 370/252 |

FOREIGN PATENT DOCUMENTS

| | | | |
|---|---|---|---|
| JP | 2010502080 | A | 1/2010 |
| RU | 2314651 | C2 | 1/2008 |
| WO | 9809395 | A1 | 3/1998 |
| WO | 2008023315 | A2 | 2/2008 |
| WO | 2011103966 | A1 | 9/2011 |
| WO | 2012152064 | A1 | 11/2012 |
| WO | 2013109041 | A1 | 7/2013 |

OTHER PUBLICATIONS

Baraniuk, R., et al., "Model-Based Compressive Sensing," IEEE Transactions on Information Theory, vol. 56, No. 4, Apr. 2010, pp. 1982-2001.
Barbotin, Y., et al., "Estimation of Sparse MIMO Channels with Common Sport," IEEE Transactions on Communications, vol. 60, No. 12, Dec. 2012, pp. 3705-3716.
Barbotin, Y., et al., "Estimating Sparse MIMO Channels Having Common Support," ICASSP 2011, pp. 2920-2923.
Berger, C., et al., "Sparse Channel Estimation for Multicarrier Underwater Acoustic Communication: From Subspace Methods to Compressed Sensing," IEEE Transactions on Signal Processing, vol. 58, No. 3, Mar. 2010, pp. 1708-1721.
Biguesh, M., et al., "Training-Based MIMO Channel Estimation: A Study of Estimator Tradeoffs and Optimal Training Signals," IEEE Transactions on Signal Processing, vol. 54, No. 3, Mar. 2006, pp. 884-893.
Chen, J., "Theoretical Results on Sparse Representations of Multiple-Measurement Vectors," IEEE Transactions on Signal Processing, vol. 54, No. 12, Dec. 2006, pp. 4634-4643.
Liang, J., et al., "Joint Compressive Sensing in Wideband Cognitive Networks," IEEE Communications Society, WCNC 2010 Proceedings, 5 pages.
Paredes, J., et al., Ultra-Wideband Compressed Sensing: Channel Estimation, IEEE Journal of Selected Topics in Signal Processing, vol. 1, No. 3, Oct. 2007, pp. 383-395.
Scaglione, A., et al., "Turbo Estimation of Channel and Symbols in Precoded MIMO Systems," ICASSP 2004, pp. 413-416.
Sharma, M., "Novel Adaptive Channel State Information Feedback for Multiuser MIMO in Wireless Broadband Communications," 2013 IEEE, 2 pages.
Tropp, J., et al., "Algorithms for Simultaneous Sparse Approximation. Part One: Greedy Pursuit," Signal Processing 86, 2006, pp. 572-588.
Zhang, Z., et al., "Application of Compressive Sensing to Limited Feedback Strategy in Large-Scale Multiple-Input Single-Output Cellular Networks," IET Communications, doi.10.1049/iet-com. 20130781, Nov. 20, 2013, 9 pages.

* cited by examiner

CHANNEL MEASUREMENT METHOD, CHANNEL MEASUREMENT APPARATUS, USER EQUIPMENT, AND SYSTEM

CROSS-REFERENCE TO RELATED APPLICATIONS

This Application is a continuation of International Application No. PCT/CN2014/076591, filed on Apr. 30, 2014, the disclosure of which is hereby incorporated by reference in its entirety.

TECHNICAL FIELD

The present invention relates to the communications technologies, and in particular, to a channel measurement method, a channel measurement apparatus, user equipment, and a system.

BACKGROUND

A large-scale antenna technology is an important technology in the future $5^{th}$ generation wireless communications system. In a wireless communications network, additional spatial multiplexing gains and diversity gains can be brought by using large-scale antennas at a base station (BS for short) end. For example, multiple antennas at the BS end may be used to implement cancellation of interference between multiple users, and multiple antennas at the BS end may also be used to implement beamforming, so that received signal energy at a user equipment (UE for short) end is improved.

In an existing frequency division duplex (FDD for short) wireless communications system, a general method for obtaining channel state information at the transmitter (CSIT for short) at a BS end is as follows: The BS end first sends a training sequence in a length of T to UE, and the UE receives a channel response sequence obtained after the training sequence passes through a channel, uses a least square method (LS for short) to restore the channel state information (CSI for short) from the channel response sequence, and then feeds back the restored CSI to the BS end by using an uplink feedback link.

However, feedback overheads of UE are high by using an existing CSIT estimation method.

SUMMARY

The present invention provides a channel measurement method, a channel measurement apparatus, user equipment, and a system, to resolve a prior-art problem of high feedback overheads of UE during CSIT estimation.

A first aspect of the present invention provides a channel measurement method, comprising:

sending, by a channel measurement apparatus, an antenna domain training sequence to at least two user equipments;

receiving, by the channel measurement apparatus, channel response measurement sequences sent by the at least two user equipments, where the channel response measurement sequences are sequences obtained after the antenna domain training sequence passes through channels and received by the at least two user equipments; and performing, by the channel measurement apparatus, joint processing on the received channel response measurement sequences of the at least two user equipments to obtain downlink channel state information (CSI).

A second aspect of the present invention provides a channel measurement method, comprising:

receiving, by user equipment, an antenna domain training sequence sent by a channel measurement apparatus; and sending, by the user equipment, a channel response measurement sequence to the channel measurement apparatus, so that the channel measurement apparatus performs joint processing on received channel response measurement sequences of the at least two user equipments to obtain downlink channel state information (CSI), where the channel response measurement sequence is a sequence that is obtained after the antenna domain training sequence passes through a channel and that is received by the user equipment.

A third aspect of the present invention provides a channel measurement apparatus, comprising:

a transmitter, configured to send an antenna domain training sequence to at least two user equipments;

a receiver, configured to receive channel response measurement sequences sent by the at least two user equipments, where the channel response measurement sequences are sequences obtained after the antenna domain training sequence passes through channels and received by the at least two user equipments; and a processor, configured to perform joint processing on the received channel response measurement sequences of the at least two user equipments to obtain downlink channel state information (CSI).

A fourth aspect of the present invention provides user equipment, comprising:

a receiver, configured to receive an antenna domain training sequence sent by a channel measurement apparatus; and a transmitter, configured to send a channel response measurement sequence to the channel measurement apparatus, so that the channel measurement apparatus performs joint processing on received channel response measurement sequences of the at least two user equipments to obtain downlink channel state information (CSI), where the channel response measurement sequence is a sequence that is obtained after the antenna domain training sequence passes through a channel and that is received by the user equipment.

The present invention provides a channel measurement method, a wireless communications system includes a channel measurement apparatus and at least two user equipments, and the method includes: sending, by the channel measurement apparatus, an antenna domain training sequence to the at least two user equipments; receiving, by the channel measurement apparatus, channel response measurement sequences sent by the at least two user equipments, where the channel response measurement sequences are sequences that are obtained after the antenna domain training sequence passes through channels and that are received by the at least two user equipments; and performing, by the channel measurement apparatus, joint processing on the received channel response measurement sequences of the at least two user equipments to obtain downlink channel state information CSI. Feedback overheads of user equipment can be reduced by using the technical solutions provided in the embodiments of the present invention.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
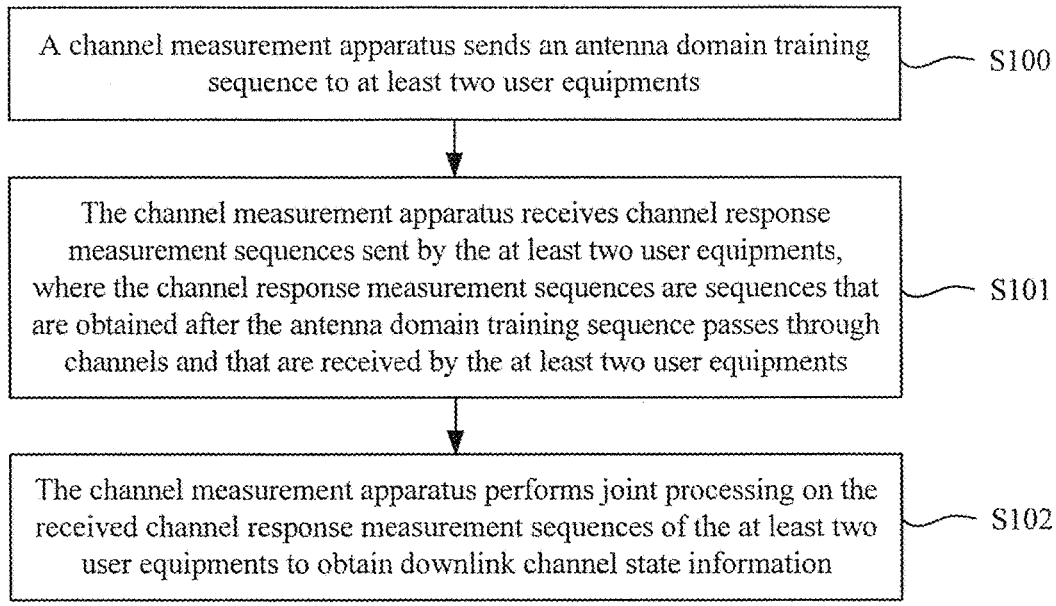
FIG. 1 is a flowchart of a channel measurement method according to an embodiment of the present invention.

FIG. 1 is a flowchart of a channel measurement method according to an embodiment of the present invention. A technical solution in this embodiment is applied to a wireless communications system that includes a channel measurement apparatus and at least two user equipments. As shown in FIG. 1, the method includes the following steps:

Step S100: The channel measurement apparatus sends an antenna domain training sequence to the at least two user equipments.

Step S101: The channel measurement apparatus receives channel response measurement sequences sent by the at least two user equipments, where the channel response measurement sequences are sequences that are obtained after the antenna domain training sequence passes through channels and that are received by the at least two user equipments.

Step S102: The channel measurement apparatus performs joint processing on the received channel response measurement sequences of the at least two user equipments to obtain downlink channel state information.

The foregoing steps are executed by the channel measurement apparatus, and actually, the channel measurement apparatus may be a base station. During implementation, specifically, the foregoing steps may be implemented in a software manner, may be implemented in a hardware manner, or may be implemented by using a combination of software and hardware.

Specifically, the channel measurement apparatus may send the antenna domain training sequence to the at least two user equipments, a total quantity of user equipments in the wireless communications system is not limited herein, and the channel measurement apparatus may send the antenna domain training sequence to the user equipments in a broadcast manner. It should be noted that the antenna domain training sequence in the present invention is a time domain-specific sequence for measuring a channel in the prior art, and in the present invention, only a sequence length is shortened, and no other change is performed on the time domain-specific sequence.

Further, the channel measurement apparatus may receive the channel response measurement sequences sent by the at least two user equipments. The channel response measurement sequences are sequences that are obtained after the antenna domain training sequence passes through the channels and that are received by the at least two user equipments. Actually, the user equipment may feedback, to the channel measurement apparatus, the channel response measurement sequences that are obtained after the antenna domain training sequence passes through the channels and that are received by the user equipments.

Still further, because the channel response measurement sequences carry channel information, and there is specific relevance between channels from the channel measurement apparatus to different user equipments, after the channel measurement apparatus receives the foregoing channel response measurement sequences of the at least two user equipments, the channel measurement apparatus may perform joint processing on the channel response measurement sequences of the at least two user equipments that are received by the channel measurement apparatus, to obtain the channel state information, that is, the downlink CSIT of the channels between the channel measurement apparatus and the user equipments.

It should be noted that a channel measurement apparatus performs joint processing on channel response measurement sequences fed back by multiple user equipments, to obtain downlink CSIT, and a length of an antenna domain training sequence sent by the channel measurement apparatus to the user equipments may be far less than a quantity of transmit antennas of the channel measurement apparatus. Therefore, compared with the prior art in which user equipment needs to feed back CSI, in this embodiment, user equipment needs to feed back only a channel response measurement sequence to a channel measurement apparatus, and therefore, feedback overheads of the user equipment are lower.

In the technical solution provided in this embodiment, a wireless communications system includes a channel measurement apparatus and at least two user equipments; the channel measurement apparatus sends an antenna domain training sequence to the at least two user equipments, then receives channel response measurement sequences sent by the at least two user equipments, where the channel response measurement sequences are sequences that are obtained after the antenna domain training sequence passes through channels and that are received by the at least two user equipments, and performs joint processing on the received channel response measurement sequences of the at least two user equipments to obtain downlink CSIT. Feedback overheads of user equipment can be reduced by using the technical solution provided in this embodiment of the present invention.

Figure 2:
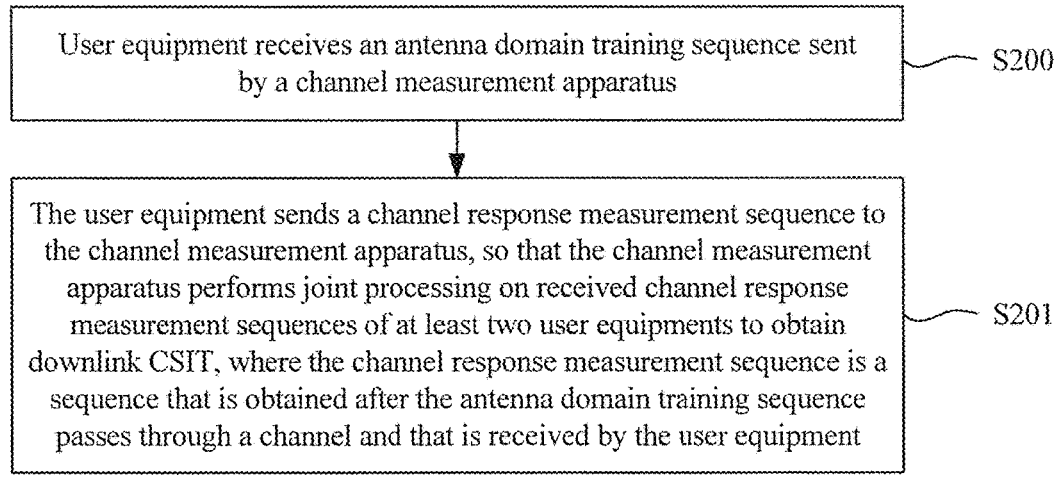
FIG. 2 is a flowchart of a channel measurement method according to an embodiment of the present invention.

FIG. 2 is a flowchart of a channel measurement method according to an embodiment of the present invention. A technical solution in this embodiment is applied to a wireless communications system that includes a channel measurement apparatus and at least two user equipments. As shown in FIG. 2, the method includes the following steps:

Step S200: The user equipment receives an antenna domain training sequence sent by the channel measurement apparatus.

Step S201: The user equipment sends a channel response measurement sequence to the channel measurement apparatus, so that the channel measurement apparatus performs joint processing on received channel response measurement sequences of the at least two user equipments to obtain downlink CSIT, where the channel response measurement sequence is a sequence that is obtained after the antenna domain training sequence passes through a channel and that is received by the user equipment.

The foregoing steps are executed by the user equipment. During implementation, specifically, the foregoing steps may be implemented in a software manner, may be implemented in a hardware manner, or may be implemented by using a combination of software and hardware.

Specifically, the user equipment may receive the antenna domain training sequence sent by the channel measurement apparatus. The antenna domain training sequence is a sequence that passes through the channel; therefore, the user equipment may send, to the channel measurement apparatus, the received antenna domain training sequence, that is, the corresponding channel response measurement sequence obtained after the antenna domain training sequence passes through the channel, so that the channel measurement apparatus can perform joint processing on the channel response measurement sequence, to obtain the downlink CSIT of the channel between the channel measurement apparatus and the user equipment.

Compared with the prior art in which user equipment needs to feed back CSI, in this embodiment, user equipment needs to feed back only a channel response measurement sequence to a channel measurement apparatus, and therefore, feedback overheads of the user equipment are lower. In addition, the user equipment does not need to perform complex computation such as channel estimation; therefore, energy consumed by the user equipment can be reduced.

In the technical solution provided in this embodiment, a wireless communications system includes a channel measurement apparatus and at least two user equipments; the user equipments receive an antenna domain training sequence sent by the channel measurement apparatus, and then send channel response measurement sequences to the channel measurement apparatus, where the channel response measurement sequences are sequences that are obtained after the antenna domain training sequence passes through channels and that are received by the at least two user equipments. Feedback overheads of user equipment can be reduced by using the technical solution provided in this embodiment of the present invention.

Figure 3:
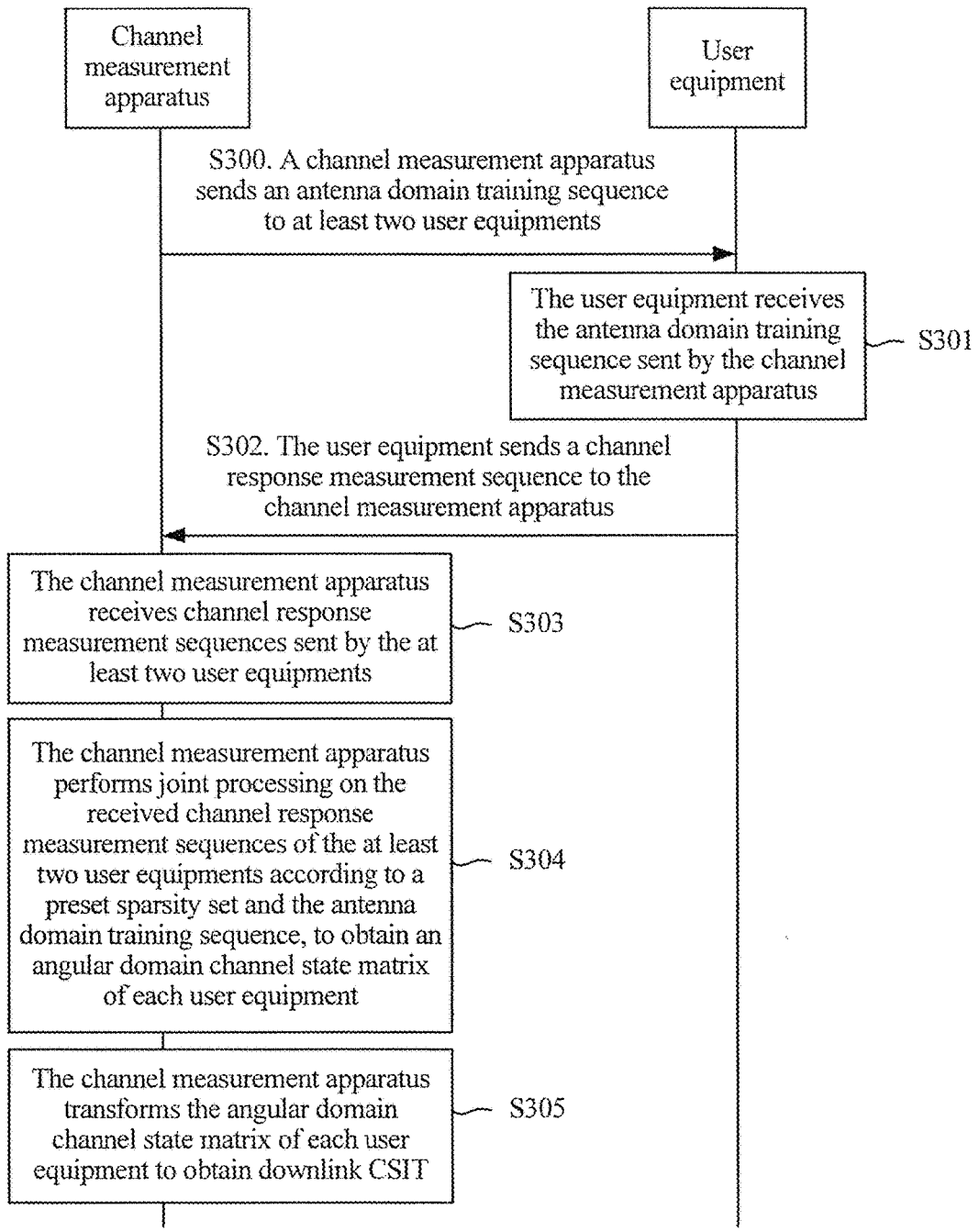
FIG. 3 is a flowchart of a channel measurement method according to an embodiment of the present invention.

FIG. 3 is a flowchart of a channel measurement method according to an embodiment of the present invention. A technical solution in this embodiment is applied to a wireless communications system that includes a channel measurement apparatus and at least two user equipments. In this embodiment, step S300 and steps S303 to S305 are executed by the channel measurement apparatus, and steps S301 and S302 are executed by the user equipment. Actually, the channel measurement apparatus may be a base station. During implementation, specifically, the foregoing steps may be implemented in a software manner, may be implemented in a hardware manner, or may be implemented by using a combination of software and hardware. For ease of subsequent description, an application scenario in this embodiment is first described herein in detail. It is assumed that the wireless communications system includes one channel measurement apparatus and K user equipments, a quantity of transmit antennas of the channel measurement apparatus is M, a quantity of receive antennas of the user equipment is N, a theoretical antenna domain channel state matrix of a channel between the channel measurement apparatus and the $i^{th}$ user equipment is represented as $H_i$, $H_i \in \square^{N*M}$, that is, $H_i$ is a matrix with N rows and M columns, and theoretical antenna domain channel state matrices of channels between the channel measurement apparatus and the different user equipments are $\{H_1, H_2, \ldots, H_K\}$, where the foregoing antenna domain channel state matrices are channel gain values on the different physical channels between the user equipments and the channel measurement apparatus, and the matrix is channel state information. As shown in FIG. 3, the method includes the following steps:

Step S300: The channel measurement apparatus sends an antenna domain training sequence to the at least two user equipments.

A description of this step is the same as that of step S100. Actually, a length of the antenna domain training sequence may be far less than the quantity of transmit antennas of the channel measurement apparatus.

Step S301: The user equipment receives the antenna domain training sequence sent by the channel measurement apparatus.

A description of this step is the same as that of step S200, and details are not described herein again.

Step S302: The user equipment sends a channel response measurement sequence to the channel measurement apparatus.

A description of this step is the same as that of step S201, and details are not described herein again.

Step S303: The channel measurement apparatus receives channel response measurement sequences sent by the at least two user equipments.

A description of this step is the same as that of step S101, and details are not described herein again.

Step S304: The channel measurement apparatus performs joint processing on the received channel response measurement sequences of the at least two user equipments according to a preset sparsity set and the antenna domain training sequence, to obtain an angular domain channel state matrix of each user equipment.

In a wireless communications system, spatial scattering objects between a channel measurement apparatus and user equipment are limited. On one hand, after a quantity of transmit antennas at a channel measurement apparatus end increases to a specific extent, CSI of the user equipment becomes sparse. On the other hand, in a multi-user large-scale antenna communications system, multiple user equipments share a wireless transmission environment; therefore, there are some association features between CSI of different user equipments. For example, when user equipment is at a relatively low physical spatial location, there is a relatively large quantity of scattering objects around the user equipment compared with a quantity N of receive antennas of the user equipment. When a path reaches user equipment from the channel measurement apparatus end, the path generally reaches the user equipment from N different receiving directions of the user equipment. Because different user equipments share a scattering environment of a channel measurement apparatus end, and the user equipments are close in terms of physical locations or directions, the user equipments may share some scattering objects at the channel measurement apparatus end. Therefore, in the multi-user large-scale antenna communications system, CSI of multiple user equipments presents a joint sparse feature, that is, the CSI of the multiple user equipments may be non-zero values at a fixed angle, but is zero at some other angles. Therefore, the channel measurement apparatus may perform joint processing on the received channel response measurement sequences of the at least two user equipments according to the preset sparsity set and the antenna domain training sequence by using the foregoing joint sparse feature, to obtain the angular domain channel state matrix of each user equipment.

The foregoing sparsity set is a preset set of quantities of non-zero columns in the angular domain channel state matrices of the user equipments, and the foregoing angular domain channel state matrix is gain values on a channel between the user equipment and the channel measurement apparatus at different angles. Actually, the sparsity set is statistics information of CSI sparsity in the multi-user wireless communications system, that is, related information of angles at which gain values on channels between multiple user equipments and the channel measurement apparatus is not zero, and the sparsity set may be preset according to a transmission environment of the wireless communications system.

For example, the foregoing sparsity set $\mathbb{S}$ may be represented as $\mathbb{S}=\{s_c\{s_i:\forall i=1, 2, \ldots, K\}\}$, where $s_c$ indicates a quantity of non-zero columns that are in the angular domain channel state matrices of the user equipments and whose index values are the same, and $s_i$ indicates a quantity of non-zero columns in an angular domain channel state matrix of the $i^{th}$ user equipment. For example, if there are two user equipments in the system, non-zero columns in an angular domain channel state matrix of the first user equipment are $\{1,3,5\}$, and non-zero columns in an angular domain channel state matrix of the second user equipment are $\{1,4,6\}$, $s_c$ is 1, and both $s_1$ and $s_2$ are 3.

Specifically, this step may be divided into the following several steps:

(1) The channel measurement apparatus transforms the antenna domain training sequence to obtain an angular domain training sequence.

It may be learned from the foregoing description that the channel measurement apparatus may perform, by using the joint sparse feature, joint processing on the channel response measurement sequences fed back by the user equipments, and before that, the channel measurement apparatus may first transform the antenna domain training sequence sent to the user equipments into the angular domain training sequence.

For example, the foregoing antenna domain training sequence may be transformed by using an angular domain transformation matrix $A_T$. When the channel measurement apparatus uses a linear array antenna, the angular domain transformation matrix $A_T$ may be $$A_T = \frac{1}{\sqrt{M}}\left[e(0), e\left(\frac{1}{M}\right), \ldots, e\left(\frac{M-1}{M}\right)\right],$$

where $e(\omega)=[1, e^{-j2\pi(\omega)}, e^{-j2\pi(2\omega)}, \ldots, e^{-j2\pi((M-1)\omega)}]^T$, and e is a natural constant; when another different antenna type such as a 3-D linear antenna or a 3-D planar antenna is used at the channel measurement apparatus end, the angular domain transformation matrix $A_T$ may be expressed in a different form. Meanings represented by same symbols subsequently are the same as the meanings herein, and details are not described again subsequently.

In an actual application, the angular domain transformation matrix $A_T$ needs to be specifically set according to a type of a transmit antenna at the channel measurement apparatus end, and the angular domain transformation matrix $A_T$ is determined and remains unchanged provided that the type of the transmit antenna at the channel measurement apparatus end is provided.

During transformation, the foregoing angular domain training sequence $\overline{X}$ may be specifically determined by using a formula $$\overline{X}=X^H A_T \qquad (1);$$ where X is the foregoing antenna domain training sequence, a length of X is T, a symbol sent by the channel measurement apparatus in the $h^{th}$ time slice is $X_h \in \square^{M*1}$, h=1, 2, ... T, dimensions of $A_T$ are T×T, dimensions of $X^H$ are M×T, and dimensions of $\overline{X}$ are M×T.

(2) The channel measurement apparatus performs processing on a channel response measurement sequence of each user equipment according to the sparsity set and the angular domain training sequence, to obtain a shared channel support set and a first residue of each user equipment.

After the angular domain training sequence is obtained, the channel measurement apparatus may perform processing on the channel response measurement sequence of each user equipment according to the preset sparsity set and the angular domain training sequence, to obtain the shared channel support set and the first residue of each user equipment. The foregoing shared channel support set indicates a set of index values of first non-zero columns, the first non-zero columns are non-zero columns that are in the angular domain channel state matrices of the user equipments and whose index values are the same, and the foregoing first residue is a residue obtained after a measurement value component generated for a channel response in the shared channel support set is subtracted.

First, the channel measurement apparatus may initialize the shared channel support set and the first residue of each user equipment.

For example, the channel measurement apparatus may initialize the shared channel support set to an empty set, and initialize the first residue of each user equipment according to the received channel response measurement sequence of each user equipment. For example, the first residue of each user equipment is initialized by using $R_i=Y_i$, where $R_i$ indicates a first residue of the $i^{th}$ user equipment, and $Y_i$ indicates a channel response measurement sequence of the $i^{th}$ user equipment that is received by the channel measurement apparatus. Meanings represented by same symbols subsequently are the same as the meanings herein, and details are not described again subsequently.

Then the channel measurement apparatus may repeatedly execute the following iterative process:

The first step is that for each user equipment, the channel measurement apparatus estimates a first angular domain channel response of each user equipment according to the first residue of the user equipment, the shared channel support set, and the foregoing sparsity set, and selects, from the first angular domain channel response of the corresponding user equipment, an index value that is of a non-zero column and expected by the user equipment, to obtain an estimated shared channel support set of the user equipment. The second step is adding an index value with a highest occurrence frequency in the estimated shared channel support set of each user equipment to the shared channel support set. The third step is that for each user equipment, the channel measurement apparatus obtains the first residue of the user equipment according to the channel response measurement sequence of the user equipment, the angular domain training sequence, and the shared channel support set.

The channel measurement apparatus first executes the foregoing first step to third step according to the initialized shared channel support set and the initialized first residue of each user equipment, then re-executes the first step to the third step according to the shared channel support set and the first residue of each user equipment that are obtained after being processed in the second step and the third step, and continues executing the first step to the third step until a quantity of execution times of the foregoing iterative process reaches a preset first threshold, where the first threshold may be $s_C$, that is, the quantity, in the preset sparsity set, of non-zero columns that are in the angular domain channel state matrices of the user equipments and whose index values are the same.

The following describes the foregoing iterative process by using specific formulas.

In the first step, for the $i^{th}$ user equipment, the channel measurement apparatus may obtain the estimated shared channel support set of the user equipment according to $$\Omega_i = \arg\max\{\{\|(\overline{X}_\Omega)^H R_i\|_F\}, \{|\Omega| = s_i - |\Omega_c^e|\}\} \quad (2); \text{ where}$$

$\Omega_i$ indicates an estimated shared channel support set of the $i^{th}$ user equipment, a meaning of $\Omega_i$ is an index value that is of a non-zero column in the angular domain channel state matrix of the user equipment and that is estimated by the user equipment, $R_i$ indicates the first residue of the $i^{th}$ user equipment, $(\overline{X}_\Omega)^H R_i$ indicates a first angular domain channel response of the $i^{th}$ user equipment, $|\Omega|$ indicates a quantity of elements in the set $\Omega$, $s_i$ indicates the quantity of non-columns in the angular domain channel state matrix of the $i^{th}$ user equipment, $\Omega_c^e$ indicates the shared channel support set, $|\Omega_c^e|$ indicates a quantity of elements in the shared channel support set, and $\|(\overline{X}_\Omega)^H R_i\|_F$ indicates a Frobenius norm of ($\overline{X}_\Omega)^H R_i$. Meanings represented by same symbols subsequently are the same as the meanings herein, and details are not described again subsequently.

For example, assuming that M is 50, and T is 100, dimensions of $\overline{X}$ are 50×100; if $|\Omega_c^e|$ is 5, and $s_1$ of the first user equipment is 8, $|\Omega|$ is 3. Therefore, an actual meaning of the formula (2) is finding, from every three columns in $\overline{X}$, an index value of one column that maximizes $\|(\overline{X}_\Omega)^H R_1\|_F$, where the index values of these maximum columns form $\Omega_1$.

In the second step, for the $i^{th}$ user equipment, the channel measurement apparatus may add the index value with the highest occurrence frequency in the estimated shared channel support set of each user equipment to the shared channel support set according to $$\Omega_c^e = \Omega_c^e \cup \left\{ j = \arg\max\left\{\sum_{i=1}^K I_{\{j \in \Omega_i\}}\right\}\right\}, I_{\{j \in \Omega_i\}} = \begin{cases} 1 & j \in \Omega_i \\ 0 & j \notin \Omega_i \end{cases}; \quad (3)$$

where j indicates the index value with the highest occurrence frequency in the estimated shared channel support set of each user equipment, and $\Omega_c^e$ indicates the shared channel support set. Meanings represented by same symbols subsequently are the same as the meanings herein, and details are not described again subsequently.

In this step, the estimated shared channel support set of each user equipment is calculated in the first step for each user equipment; therefore, this step is performing processing on all the estimated shared channel support sets of the user equipments to find the column index values with the highest occurrence frequencies and adding the column index values with the highest occurrence frequencies to the shared channel support set.

For example, if in the first step, an estimated shared channel support set of the first user equipment is {1,3,5,7}, and an estimated shared channel support set of the second user equipment is {1,3}, if only the two user equipments exist, $\Omega_c^e$ calculated in the formula (2) is {1,3} because the index value 1 and the index value 3 are in both the estimated shared channel support set of the first user equipment and the estimated shared channel support set of the second user equipment.

In the third step, for the $i^{th}$ user equipment, the channel measurement apparatus may obtain the first residue $R_i$ of the user equipment according to $$R_i = (I - \overline{X}_{\Omega_c^e})(\overline{X}_{\Omega_c^e})^+ Y_i \quad (4); \text{ where}$$

I indicates an identity matrix, $\Omega_c^e$ indicates the shared channel support set, $\overline{X}_{\Omega_c^e}$ indicates a submatrix that includes a column vector, in the angular domain training sequence, whose index value belongs to the shared channel support set $\Omega_c^e$, $(\overline{X}_{\Omega_c^e})^+$ indicates a pseudo-inverse of $\overline{X}_{\Omega_c^e}$, and $\overline{Y}_i = Y_i^H$ Meanings represented by same symbols subsequently are the same as the meanings herein, and details are not described again subsequently.

(3) The channel measurement apparatus obtains a channel support set of each user equipment according to the angular domain training sequence, the shared channel support set, the first residue of each user equipment, and the sparsity set.

After the shared channel support set is obtained, the channel measurement apparatus may obtain the channel support set of each user equipment according to the angular domain training sequence, the shared channel support set, the residue of each user equipment, and the sparsity set. The foregoing channel support set indicates a set of index values of second non-zero columns, and the second non-zero column is a non-zero column in the angular domain channel state matrix of the user equipment.

First, the channel measurement apparatus may initialize the channel support set of each user equipment and a second residue of each user equipment, where the second residue is a residue obtained after a measurement value component generated for a channel response in the channel support set is subtracted.

For example, the channel measurement apparatus may initialize the channel support set of each user equipment by using the foregoing shared channel support set, that is, set an initial value of the channel support set of each user equipment to the shared channel support set, and initialize the second residue by using the foregoing first residue, that is, set an initial value of the second residue of each user equipment to the first residue.

Then the channel measurement apparatus executes the following iterative process for each user equipment:

The first step is estimating a second angular domain channel response of the user equipment according to the second residue of the user equipment, selecting, from the second angular domain channel response, an index value that is of a non-zero column and expected by the user equipment, and adding the index value that is of the non-zero column and expected by the user equipment to the channel support set of the user equipment. The second step is obtaining the second residue of the user equipment according to the received channel response measurement sequence of the user equipment, the angular domain training sequence, and the channel support set of the user equipment.

For each user equipment, the channel measurement apparatus first executes the foregoing first step and second step according to the initialized channel support set and the initialized second residue of the user equipment, and then determines whether the second residue of the user equipment reaches a preset value or whether a quantity of repeated operation times reaches a preset second threshold; if neither condition is met, the channel measurement apparatus then re-executes the first step and the second step according to the channel support set obtained after being processed in the first step and the second residue of the user equipment that is obtained after being processed in the second step, and continues executing the first step and the second step until the stop condition is met, where the second threshold may be $s_i$, that is, the quantity, in the preset sparsity set, of non-zero columns in the angular domain channel state matrix of the $i^{th}$ user equipment.

It should be noted that the foregoing preset value η may be set according to a channel noise energy value. Assuming that an average channel noise energy value is $N_0$, a value of η is generally $η=αN_0T$, where α>1. For example, a typical value assignment method is α=2.

The following describes the foregoing iterative process by using specific formulas.

In the first step, for the $i^{th}$ user equipment, the channel measurement apparatus may add the index value that is of the non-zero column and expected by the user equipment to the channel support set of the user equipment according to $$\Omega_i^e = \Omega_i^e \cup \{\arg\max\{\|(\overline{X}(k))^H R_i\|_F\}\} \quad (5);$$

where
$\overline{X}(k)$ indicates the $k^{th}$ column in the angular domain training sequence.

In the second step, for the $i^{th}$ user equipment, the channel measurement apparatus may obtain the second residue of the user equipment according to $$R_i = (I - \overline{X}_{\Omega_i^e})(\overline{X}_{\Omega_i^e})^+ Y_i \quad (6).$$

It may be learned that in this step, the channel measurement apparatus first calculates the common shared channel support set of the user equipments, and then calculates the channel support set of each user equipment, so as to determine an index value of a non-zero column in the angular domain channel state matrix of each user equipment.

(4) The channel measurement apparatus obtains the angular domain channel state matrix of each user equipment according to the channel support set of each user equipment, the angular domain training sequence, and the received channel response measurement sequence of each user equipment.

Specifically, the channel measurement apparatus may obtain a value of a non-zero column in the angular domain channel state matrix of each user equipment according to the channel support set of each user equipment, the angular domain training sequence, and the received channel response measurement sequence of each user equipment.

For example, the channel measurement apparatus may obtain the angular domain channel state matrix of each user equipment according to $$(\overline{H_i^e})^{\Omega_i^e} = (\overline{X}_{\Omega_i^e})^+ Y_i \quad (7); \text{ where}$$

$(\overline{H_i^e})^{\Omega_i^e}$ indicates the value of the non-zero column in the angular domain channel state matrix of each user equipment, and $\overline{H_i^e}$ indicates the angular domain channel state matrix of each user equipment.

Then the channel measurement apparatus sets a value in the angular domain channel state matrix of each user equipment except the non-zero column to 0 according to the quantity of transmit antennas, and in this case, can obtain the angular domain channel state matrix of each user equipment.

Step S305: The channel measurement apparatus transforms the angular domain channel state matrix of each user equipment to obtain downlink CSIT.

Specifically, the channel measurement apparatus may transform the angular domain channel state matrix of the $i^{th}$ user equipment according to $$H_i^e = (\overline{H_i^e})^H A_T^H \quad (8),$$

and finally obtain the downlink CSIT of the channel between the channel measurement apparatus and each user equipment; where $\overline{H_i^e}$ indicates the angular domain channel state matrix of the $i^{th}$ user equipment.

It should be noted that actually, in view of diversity of a wireless communications system, assuming that there are totally U user equipments in the wireless communications system, the U user equipments possibly cannot share a same channel support set because geographical locations at which the U user equipments are located are different. For this case, the channel measurement apparatus may first group all user equipments according to channel states of all the user equipments in the system, then send an antenna domain training sequence to user equipments in a group, and then perform joint processing on channel response measurement sequences of user equipments in each group according to a method described in steps S303 to S305, to finally obtain downlink CSIT.

Compared with the prior art, in this embodiment, dimensions of a channel response measurement sequence fed back by user equipment to a channel measurement apparatus are N×T, and actually, a length T of a sequence transmitted by the channel measurement apparatus may be far less than a quantity M of transmit antennas of the channel measurement apparatus because the channel measurement apparatus performs joint processing on channel response measurement sequences of at least two user equipments in the technical solution in this embodiment. In the prior art, a channel state matrix fed back by user equipment to a channel measurement apparatus is N×M, and because T is far less than M, feedback overheads of user equipment can be reduced by using the solution in this embodiment.

In the technical solution provided in this embodiment, a wireless communications system includes a channel measurement apparatus and at least two user equipments; the channel measurement apparatus sends an antenna domain training sequence to the at least two user equipments, then receives channel response measurement sequences sent by the at least two user equipments, where the channel response measurement sequences are sequences that are obtained after the antenna domain training sequence passes through channels and that are received by the at least two user equipments, and performs joint processing on the received channel response measurement sequences of the at least two user equipments to obtain downlink CSIT. Feedback overheads of user equipment can be reduced by using the technical solution provided in this embodiment of the present invention.

Multiple embodiments are currently described with reference to the accompanying drawings, and same parts in this specification are indicated by a same reference numeral. In the following description, for ease of explanation, many specific details are provided to facilitate comprehensive understanding of one or more embodiments. However, apparently, the embodiments may also be implemented without using these specific details. In other examples, well-known structures and devices are shown in a form of block diagrams to conveniently describe one or more embodiments.

Terminologies such as "part", "module", "system", and the like used in this specification are used to indicate computer-related entities, hardware, firmware, combinations of hardware and software, software, or software being executed. For example, a part may be but is not limited to a process that runs on a processor, a processor, an object, an executable file, a thread of execution, a program, and/or a computer. As shown in figures, both an application that runs on a computing device and a computing device may be parts. One or more parts may reside within a process and/or a thread of execution, and a part may be located on one computer and/or distributed between two or more computers. In addition, these parts may be executed from various computer-readable media that store various data structures. For example, the parts may communicate by using a local and/or remote process and according to, for example, a signal having one or more data packets (for example, data from two parts interacting with another part in a local system, a distributed system, and/or across a network such as the Internet interacting with other systems by using the signal).

User equipment (UE for short) in this embodiment of the present invention may also be referred to as a system, a subscriber unit, a subscriber station, a mobile station, a mobile, a remote station, a remote terminal, a mobile device, a user terminal, a terminal, a wireless communications device, a user agent, or a user apparatus. An access terminal may be a cellular phone, a cordless phone, a Session Initiation Protocol (SIP for short) phone, a wireless local loop (WLL for short) station, a personal digital assistant (PDA for short), a handheld device that has a wireless communication function, a vehicle-mounted device, a wearable device, a computing device, or another processing device that is connected to a wireless modem.

In addition, an apparatus in this embodiment of the present invention that is used to measure a channel may be a base station. The base station may be used to communicate with a mobile device. The base station may be a wireless (WiFi) wireless access point (AP for short), or abase transceiver station (Base Transceiver Station, BTS for short) in Global System for Mobile Communications (GSM for short) or Code Division Multiple Access CDMA for short), or may be a NodeB (NB for short) in Wideband Code Division Multiple Access (WCDMA for short), or may be an evolved NodeB (eNB or eNodeB for short) in Long Term Evolution (LTE for short), a relay station or an access point, a base station device in a future 5G network, or the like.

In addition, aspects or features of the present invention may be implemented as an apparatus or a product that uses standard programming and/or engineering technologies. The term "product" used in this application covers a computer program that can be accessed from any computer-readable part, carrier, or medium. For example, the computer-readable medium may include but is not limited to: a magnetic storage part (for example, a hard disk, a floppy disk, or a magnetic tape), an optical disc (for example, a compact disc (CD for short) or a digital versatile disc (DVD for short)), a smart card and a flash memory part (for example, an erasable programmable read-only memory (EPROM for short), a card, a stick, or a key drive).

Figure 4:
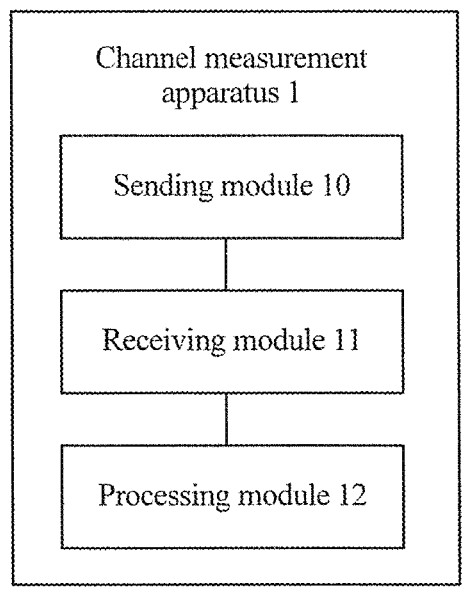
FIG. 4 is a schematic structural diagram of a channel measurement apparatus according to an embodiment of the present invention.

FIG. 4 is a schematic structural diagram of a channel measurement apparatus according to an embodiment of the present invention. A wireless communications system includes the channel measurement apparatus and at least two user equipments. As shown in FIG. 4, the channel measurement apparatus 1 includes a sending module 10, a receiving module 11, and a processing module 12.

Specifically, the sending module 10 is configured to send an antenna domain training sequence to the at least two user equipments; the receiving module 11 is configured to receive channel response measurement sequences sent by the at least two user equipments, where the channel response measurement sequences are sequences that are obtained after the antenna domain training sequence passes through channels and that are received by the at least two user equipments; and the processing module 12 is configured to perform joint processing on the received channel response measurement sequences of the at least two user equipments to obtain downlink channel state information CSIT.

Further, the processing module 11 is specifically configured to: perform joint processing on the received channel response measurement sequences of the at least two user equipments according to a preset sparsity set and the antenna domain training sequence, to obtain an angular domain channel state matrix of each user equipment, where the sparsity set is a preset set of quantities of non-zero columns in the angular domain channel state matrices of the user equipments; and transform the angular domain channel state matrix of each user equipment to obtain the downlink CSIT.

Still further, the processing module 11 is specifically configured to: transform the antenna domain training sequence to obtain an angular domain training sequence; perform processing on a channel response measurement sequence of each user equipment according to the sparsity set and the angular domain training sequence, to obtain a shared channel support set and a first residue of each user equipment, where the first residue is a residue obtained after a measurement value component generated for a channel response in the shared channel support set is subtracted; obtain a channel support set of each user equipment according to the angular domain training sequence, the shared channel support set, the first residue of each user equipment, and the sparsity set; and obtain the angular domain channel state matrix of each user equipment according to the channel support set of each user equipment, the angular domain training sequence, and the received channel response measurement sequence of each user equipment.

Still further, the processing module 11 is specifically configured to: initialize the shared channel support set and the first residue of each user equipment, and repeatedly execute the following steps until a quantity of repeated operation times reaches a preset first threshold: estimating a first angular domain channel response of each user equipment according to the first residue of each user equipment, the shared channel support set, and the sparsity set, and selecting, from the first angular domain channel response of the corresponding user equipment, an index value that is of a non-zero column and expected by the user equipment, to obtain an estimated shared channel support set of the user equipment; adding an index value with a highest occurrence frequency in the estimated shared channel support set of each user equipment to the shared channel support set; and obtaining the first residue of the user equipment according to the channel response measurement sequence of each user equipment, the angular domain training sequence, and the shared channel support set.

Still further, the processing module 11 is specifically configured to: initialize the channel support set of each user equipment and a second residue of each user equipment, where the second residue is a residue obtained after a measurement value component generated for a channel response in the channel support set is subtracted; and repeatedly execute the following steps until the residue of the user equipment reaches a preset value or a quantity of repeated operation times reaches a preset second threshold: after estimating a second angular domain channel response of the user equipment and selecting, from the second angular domain channel response, an index value that is of a non-zero column and expected by the user equipment, adding the index value that is of the non-zero column and expected by the user equipment to the channel support set of the user equipment according to the second residue of the user equipment; and obtaining the second residue of the user equipment according to the received channel response measurement sequence of the user equipment, the angular domain training sequence, and the channel support set of the user equipment, where the second residue is a residue obtained after a measurement value component generated for a channel response in the channel support set of the user equipment is subtracted.

Still further, the processing module 11 is specifically configured to: obtain a value of a non-zero column in the angular domain channel state matrix of each user equipment according to the channel support set of each user equipment, the angular domain training sequence, and the received channel response measurement sequence of each user equipment; and set a value in the angular domain channel state matrix of each user equipment except the non-zero column to 0 according to a quantity of transmit antennas, to obtain the angular domain channel state matrix of each user equipment.

Still further, the processing module 11 is specifically configured to:

obtain the estimated shared channel support set of the user equipment according to $$\Omega_i = \arg\max\{\{\|(\overline{X}_\Omega)^H R_i\|_F\}, \{|\Omega| = s_i - |\Omega_c^e|\}\} \quad (9); \text{ where}$$

$\Omega_i$ indicates an estimated shared channel support set of the $i^{th}$ user equipment, $\overline{X}_\Omega$ indicates a submatrix that includes a column vector, in the angular domain training sequence, whose index value belongs to a set $\Omega$, $R_i$ indicates a first residue of the $i^{th}$ user equipment, $(\overline{X}_\Omega)^H R_i$ indicates a first angular domain channel response of the $i^{th}$ user equipment, $|\Omega|$ indicates a quantity of elements in the set $\Omega$, $s_i$ indicates a quantity of non-zero columns in an angular domain channel state matrix of the $i^{th}$ user equipment, $\Omega_c^e$ indicates the shared channel support set, $|\Omega_c^e|$ indicates a quantity of elements in the shared channel support set, and $\|(\overline{X}_\Omega)^H R_i\|_F$ indicates a Frobenius norm of $(\overline{X}_\Omega)^H R_i$.

Still further, the processing module 11 is specifically configured to:

add the index value with the highest occurrence frequency in the estimated shared channel support set of each user equipment to the shared channel support set according to $$\Omega_c^e = \Omega_c^e \cup \left\{ j = \arg\max\left\{ \sum_{i=1}^{K} I_{\{j \in \Omega_i\}} \right\} \right\}, I_{\{j \in \Omega_i\}} = \begin{cases} 1 & j \in \Omega_i \\ 0 & j \notin \Omega_i \end{cases} ; \quad (10)$$

where j indicates the index value with the highest occurrence frequency in the estimated shared channel support set of each user equipment, $\Omega_c^e$ indicates the shared channel support set, K indicates a total quantity of at least two user equipments, and $\Omega_i$ indicates the estimated shared channel support set of the $i^{th}$ user equipment.

Still further, the processing module 11 is specifically configured to:

obtain the first residue of the user equipment according to $$R_i = (I - \overline{X}_{\Omega_c^e})(\overline{X}_{\Omega_c^e})^+ Y_i \quad (11); \text{ where}$$

$R_i$ indicates the first residue of the $i^{th}$ user equipment, I indicates an identity matrix, $\Omega_c^e$ indicates the shared channel support set, $\overline{X}_{\Omega_c^e}$ indicates a submatrix that includes a column vector, in the angular domain training sequence, whose index value belongs to the shared channel support set $\Omega_c^e$, $(\overline{X}_{\Omega_c^e})^+$ indicates a pseudo inverse of $\overline{X}_{\Omega_c^e}$, $\overline{Y}_i = Y_i^H$, and $Y_i$ indicates the received channel response measurement sequence of each user equipment.

Still further, the processing module 11 is specifically configured to:

add the index value that is of the non-zero column and expected by the user equipment to the channel support set of the user equipment according to $$\Omega_i^e = \Omega_i^e \cup \{\arg\max\{\|(\overline{X}(k))^H R_i\|_F\}\} \quad (12); \text{ where}$$

$\Omega_i^e$ indicates a channel support set of the $i^{th}$ user equipment, $\overline{X}(k)$ indicates the $k^{th}$ column in the angular domain training sequence, $R_i$ indicates a residue of the $i^{th}$ user equipment, $\overline{X}(k)^H R_i$ indicates a second angular domain channel response of the $i^{th}$ user equipment, and $\|(\overline{X}(k))^H R_i\|_F$ indicates a Frobenius norm of $(\overline{X}_\Omega)^H R_i$.

Still further, the processing module 11 is specifically configured to:

obtain the second residue of the user equipment according to $$R_i = (I - \overline{X}_{\Omega_i^e})(\overline{X}_{\Omega_i^e})^+ \overline{Y}_i \quad (13); \text{ where}$$

$R_i$ indicates the second residue of the $i^{th}$ user equipment, I indicates an identity matrix, $\Omega_i^e$ indicates the channel support set of the $i^{th}$ user equipment, $\overline{X}_{\Omega_i^e}$ indicates the submatrix that includes the column vector, in the angular domain training sequence, whose index value belongs to the channel support set $\Omega_i^e$, $(\overline{X}_{\Omega_i^e})^+$ indicates a pseudo-inverse of $\overline{X}_{\Omega_i^e}$, $\overline{Y}_i = Y_i^H$, and $Y_i$ indicates the received channel response measurement sequence of each user equipment.

Still further, the processing module 11 is specifically configured to:

obtain the angular domain channel state matrix of each user equipment according to $$(\overline{H_i^e})^{\Omega_i^e} = (\overline{X}_{\Omega_i^e})^+ \overline{Y}_i \quad (14); \text{ where}$$

$(\overline{H_i^e})^{\Omega_i^e}$ indicates the value of the non-zero column in the angular domain channel state matrix of each user equipment, $\Omega_i^e$ indicates the channel support set of the $i^{th}$ user equipment, $\overline{H_i^e}$ indicates the angular domain channel state matrix of each user equipment, $\overline{X}_{\Omega_i^e}$ indicates the submatrix that includes the column vector, in the angular domain training sequence, whose index value belongs to the channel support set $\Omega_i^e$, $(\overline{X}_{\Omega_i^e})^+$ indicates a pseudo-inverse of $\overline{X}_{\Omega_i^e}$, $\overline{Y}_i = Y_i^H$, and $Y_i$ indicates the received channel response measurement sequence of each user equipment.

Still further, the channel measurement apparatus 1 is a base station.

In the technical solution provided in this embodiment, a wireless communications system includes a channel measurement apparatus 1 and at least two user equipments; the channel measurement apparatus 1 sends an antenna domain training sequence to the at least two user equipments, then receives channel response measurement sequences sent by the at least two user equipments, where the channel response measurement sequences are sequences that are obtained after the antenna domain training sequence passes through channels and that are received by the at least two user equipments, and performs joint processing on the received channel response measurement sequences of the at least two user equipments to obtain downlink CSIT. Feedback overheads of user equipment can be reduced by using the technical solution provided in this embodiment of the present invention.

Figure 5:
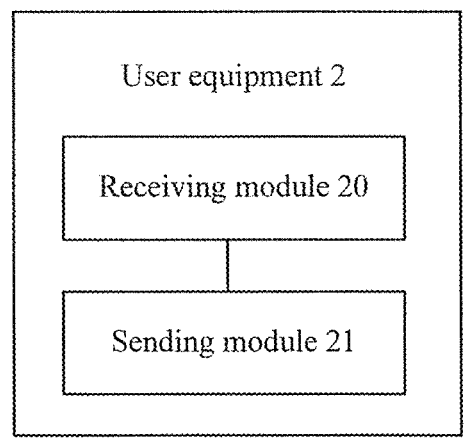
FIG. 5 is a schematic structural diagram of user equipment according to an embodiment of the present invention.

FIG. 5 is a schematic structural diagram of user equipment according to an embodiment of the present invention. A wireless communications system includes a channel measurement apparatus and at least two user equipments. As shown in FIG. 5, the user equipment 2 includes a receiving module 20 and a sending module 21.

Specifically, the receiving module 20 is configured to receive an antenna domain training sequence sent by the channel measurement apparatus; and the sending module 21 is configured to send a channel response measurement sequence to the channel measurement apparatus, so that the channel measurement apparatus performs joint processing on received channel response measurement sequences of the at least two user equipments to obtain downlink channel state information CSIT, where the channel response measurement sequence is a sequence that is obtained after the antenna domain training sequence passes through a channel and that is received by the user equipment.

In the technical solution provided in this embodiment, a wireless communications system includes a channel measurement apparatus and at least two user equipments 2; the user equipments 2 receive an antenna domain training sequence sent by the channel measurement apparatus, and then send channel response measurement sequences to the channel measurement apparatus, where the channel response measurement sequences are sequences that are obtained after the antenna domain training sequence passes through channels and that are received by the at least two user equipments. Feedback overheads of user equipment can be reduced by using the technical solution provided in this embodiment of the present invention.

Figure 6:
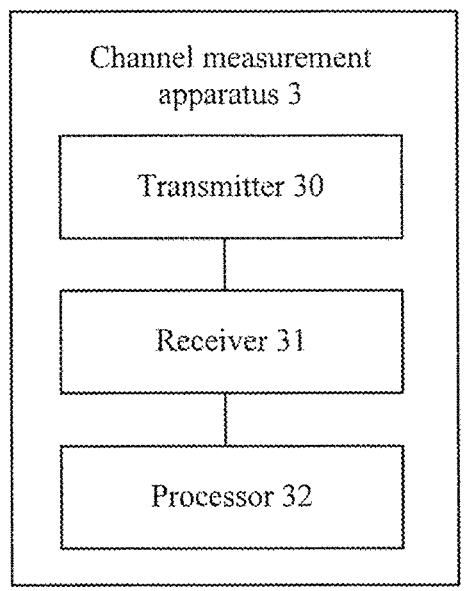
FIG. 6 is a schematic structural diagram of a channel measurement apparatus according to an embodiment of the present invention.

FIG. 6 is a schematic structural diagram of a channel measurement apparatus according to an embodiment of the present invention. A wireless communications system includes the channel measurement apparatus and at least two user equipments. As shown in FIG. 6, the channel measurement apparatus 3 includes a transmitter 30, a receiver 31, and a processor 32.

Specifically, the transmitter 30 is configured to send an antenna domain training sequence to the at least two user equipments; the receiver 31 is configured to receive channel response measurement sequences sent by the at least two user equipments, where the channel response measurement sequences are sequences that are obtained after the antenna domain training sequence passes through channels and that are received by the at least two user equipments; and the processor 32 is configured to perform joint processing on the received channel response measurement sequences of the at least two user equipments to obtain downlink channel state information CSIT.

Further, the processor 32 is specifically configured to: perform joint processing on the received channel response measurement sequences of the at least two user equipments according to a preset sparsity set and the antenna domain training sequence, to obtain an angular domain channel state matrix of each user equipment, where the sparsity set is a preset set of quantities of non-zero columns in the angular domain channel state matrices of the user equipments; and transform the angular domain channel state matrix of each user equipment to obtain the downlink CSIT.

Still further, the processor 32 is specifically configured to: transform the antenna domain training sequence to obtain an angular domain training sequence; perform processing on a channel response measurement sequence of each user equipment according to the sparsity set and the angular domain training sequence, to obtain a shared channel support set and a first residue of each user equipment, where the first residue is a residue obtained after a measurement value component generated for a channel response in the shared channel support set is subtracted; obtain a channel support set of each user equipment according to the angular domain training sequence, the shared channel support set, the first residue of each user equipment, and the sparsity set; and obtain the angular domain channel state matrix of each user equipment according to the channel support set of each user equipment, the angular domain training sequence, and the received channel response measurement sequence of each user equipment.

Still further, the processor 32 is specifically configured to: initialize the shared channel support set and the first residue of each user equipment, and repeatedly execute the following steps until a quantity of repeated operation times reaches a preset first threshold: estimating a first angular domain channel response of each user equipment according to the first residue of each user equipment, the shared channel support set, and the sparsity set, and selecting, from the first angular domain channel response of the corresponding user equipment, an index value that is of a non-zero column and expected by the user equipment, to obtain an estimated shared channel support set of the user equipment; adding an index value with a highest occurrence frequency in the estimated shared channel support set of each user equipment to the shared channel support set; and obtaining the first residue of the user equipment according to the channel response measurement sequence of each user equipment, the angular domain training sequence, and the shared channel support set.

Still further, the processor 32 is specifically configured to: initialize the channel support set of each user equipment and a second residue of each user equipment, where the second residue is a residue obtained after a measurement value component generated for a channel response in the channel support set is subtracted; and repeatedly execute the following steps until the residue of the user equipment reaches a preset value or a quantity of repeated operation times reaches a preset second threshold: after estimating a second angular domain channel response of the user equipment and selecting, from the second angular domain channel response, an index value that is of a non-zero column and expected by the user equipment, adding the index value that is of the non-zero column and expected by the user equipment to the channel support set of the user equipment according to the second residue of the user equipment; and obtaining the second residue of the user equipment according to the received channel response measurement sequence of the user equipment, the angular domain training sequence, and the channel support set of the user equipment, where the second residue is a residue obtained after a measurement value component generated for a channel response in the channel support set of the user equipment is subtracted.

Still further, the processor 32 is specifically configured to: obtain a value of anon-zero column in the angular domain channel state matrix of each user equipment according to the channel support set of each user equipment, the angular domain training sequence, and the received channel response measurement sequence of each user equipment; and set a value in the angular domain channel state matrix of each user equipment except the non-zero column to 0 according to a quantity of transmit antennas, to obtain the angular domain channel state matrix of each user equipment.

Still further, the processor 32 is specifically configured to:
obtain the estimated shared channel support set of the user equipment according to $$\Omega_i = \arg\max\{\{\|(\overline{X}_\Omega)^H R_i\|_F\}, \{|\Omega| = s_i - |\Omega_c^e|\}\} \quad (15); \text{ where}$$

$\Omega_i$ indicates an estimated shared channel support set of the $i^{th}$ user equipment, $\overline{X}_\Omega$ indicates a submatrix that includes a column vector, in the angular domain training sequence, whose index value belongs to a set $\Omega$, $R_i$ indicates a first residue of the $i^{th}$ user equipment, $(\overline{X}_\Omega)^H R_i$ indicates a first angular domain channel response of the $i^{th}$ user equipment, $\|\Omega\|$ indicates a quantity of elements in the set $\Omega$, $s_i$ indicates a quantity of non-zero columns in an angular domain channel state matrix of the $i^{th}$ user equipment, $\Omega_c^e$ indicates the shared channel support set, $|\Omega_c^e|$ indicates a quantity of elements in the shared channel support set, and $\|(\overline{X}_\Omega)^H R_i\|_F$ indicates a Frobenius norm of $(\overline{X}_\Omega)^H R_i$.

Still further, the processor 32 is specifically configured to:
add the index value with the highest occurrence frequency in the estimated shared channel support set of each user equipment to the shared channel support set according to $$\Omega_c^e = \Omega_c^e \cup \left\{ j = \arg\max\left\{\sum_{i=1}^{K} I_{\{j \in \Omega_i\}}\right\} \right\}, I_{\{j \in \Omega_i\}} = \begin{cases} 1 & j \in \Omega_i \\ 0 & j \notin \Omega_i \end{cases} ; \quad (16)$$

where
j indicates the index value with the highest occurrence frequency in the estimated shared channel support set of each user equipment, $\Omega_c^e$ indicates the shared channel support set, K indicates a total quantity of at least two user equipments, and $\Omega_i$ indicates the estimated shared channel support set of the $i^{th}$ user equipment.

Still further, the processor 32 is specifically configured to:
obtain the first residue of the user equipment according to $$R_i = (I - \overline{X}_{\Omega_c^e})(\overline{X}_{\Omega_c^e})^+ Y_i \quad (17); \text{ where}$$

$R_i$ indicates the first residue of the $i^{th}$ user equipment, I indicates an identity matrix, $\Omega_c^e$ indicates the shared channel support set, $\overline{X}_{\Omega_c^e}$ indicates a submatrix that includes a column vector, in the angular domain training sequence, whose index value belongs to the shared channel support set $\Omega_c^e$, $(\overline{X}_{\Omega_c^e})^+$ indicates a pseudo-inverse of $\overline{X}_{\Omega_c^e}$, $Y_i = Y_i^H$, and $Y_i$ indicates the received channel response measurement sequence of each user equipment.

Still further, the processor 32 is specifically configured to:
add the index value that is of the non-zero column and expected by the user equipment to the channel support set of the user equipment according to $$\Omega_i^e = \Omega_i^e \cup \{\arg\max\{\|(\overline{X}(k))^H R_i\|_F\}\} \quad (18); \text{ where}$$

$\Omega_i^e$ indicates a channel support set of the $i^{th}$ user equipment, $\overline{X}(k)$ indicates the $k^{th}$ column in the angular domain training sequence, $R_i$ indicates a residue of the $i^{th}$ user equipment, $\overline{X}(k)^H R_i$ indicates a second angular domain channel response of the $i^{th}$ user equipment, and $\|(\overline{X}(k))^H R_i\|_F$ indicates a Frobenius norm of $(\overline{X}_\Omega)^H R_i$.

Still further, the processor 32 is specifically configured to:
obtain the second residue of the user equipment according to $$R_i = (I - \overline{X}_{\Omega_i^e})(\overline{X}_{\Omega_i^e})^+ Y_i \quad (19); \text{ where}$$

$R_i$ indicates the second residue of the $i^{th}$ user equipment, I indicates an identity matrix, $\Omega_i^e$ indicates the channel support set of the $i^{th}$ user equipment, $\overline{X}_{\Omega_i^e}$ indicates the submatrix that includes the column vector, in the angular domain training sequence, whose index value belongs to the channel support set $\Omega_i^e$, $(\overline{X}_{\Omega_i^e})^+$ indicates a pseudo-inverse of $\overline{X}_{\Omega_i^e}$, $Y_i = Y_i^H$, and $Y_i$ indicates the received channel response measurement sequence of each user equipment.

Still further, the processor 32 is specifically configured to:
obtain the angular domain channel state matrix of each user equipment according to $$(\overline{H_i^e})^{\Omega_i^e} = (\overline{X}_{\Omega_i^e})^+ Y_i \quad (20); \text{ where}$$

$(\overline{H_i^e})^{\Omega_i^e}$ indicates the value of the non-zero column in the angular domain channel state matrix of each user equipment, $\Omega_i^e$ indicates the channel support set of the $i^{th}$ user equipment, $\overline{H_i^e}$ indicates the angular domain channel state matrix of each user equipment, $\overline{X}_{\Omega_i^e}$ indicates the submatrix that includes the column vector, in the angular domain training sequence, whose index value belongs to the channel support set $\Omega_i^e$, $(\overline{X}_{\Omega_i^e})^+$ indicates a pseudo-inverse of $\overline{X}_{\Omega_i^e}$, $Y_i = Y_i^H$, and $Y_i$ indicates the received channel response measurement sequence of each user equipment.

Still further, the channel measurement apparatus 3 is a base station.

In the technical solution provided in this embodiment, a wireless communications system includes a channel measurement apparatus 3 and at least two user equipments; the channel measurement apparatus 3 sends an antenna domain training sequence to the at least two user equipments, then receives channel response measurement sequences sent by the at least two user equipments, where the channel response measurement sequences are sequences that are obtained after the antenna domain training sequence passes through channels and that are received by the at least two user equipments, and performs joint processing on the received channel response measurement sequences of the at least two user equipments to obtain CSIT. Feedback overheads of user equipment can be reduced by using the technical solution provided in this embodiment of the present invention.

Figure 7:
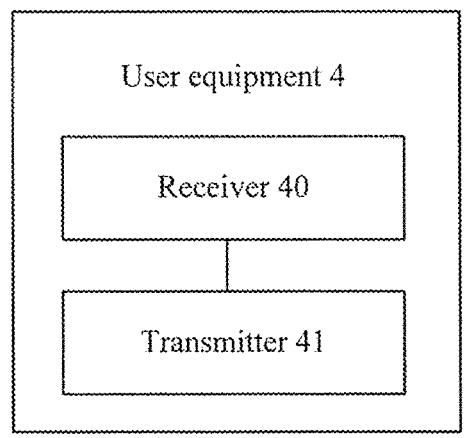
FIG. 7 is a schematic structural diagram of user equipment according to an embodiment of the present invention.

FIG. 7 is a schematic structural diagram of user equipment according to an embodiment of the present invention. A wireless communications system includes a channel measurement apparatus and at least two user equipments. As shown in FIG. 7, the user equipment 4 includes a receiver 40 and a transmitter 41.

Specifically, the receiver 40 is configured to receive an antenna domain training sequence sent by the channel measurement apparatus; and the transmitter 41 is configured to send a channel response measurement sequence to the channel measurement apparatus, so that the channel measurement apparatus performs joint processing on received channel response measurement sequences of the at least two user equipments to obtain downlink channel state information CSIT, where the channel response measurement sequence is a sequence that is obtained after the antenna domain training sequence passes through a channel and that is received by the user equipment.

In the technical solution provided in this embodiment, a wireless communications system includes a channel measurement apparatus and at least two user equipments 4; the user equipments 4 receive an antenna domain training sequence sent by the channel measurement apparatus, and then send channel response measurement sequences to the channel measurement apparatus, where the channel response measurement sequences are sequences that are obtained after the antenna domain training sequence passes through channels and that are received by the at least two user equipments. Feedback overheads of user equipment can be reduced by using the technical solution provided in this embodiment of the present invention.

Further, the present invention provides a system, and the system includes the channel measurement apparatus 1 in FIG. 4 and at least two user equipments 2 in FIG. 5.

Still further, the present invention further provides a system, and the system includes the channel measurement apparatus 3 in FIG. 6 and at least two user equipments 4 in FIG. 7.

In the technical solution provided in this embodiment, a wireless communications system includes a channel measurement apparatus and at least two user equipments; the channel measurement apparatus sends an antenna domain training sequence to the at least two user equipments, then receives channel response measurement sequences sent by the at least two user equipments, where the channel response measurement sequences are sequences that are obtained after the antenna domain training sequence passes through channels and that are received by the at least two user equipments, and performs joint processing on the received channel response measurement sequences of the at least two user equipments to obtain downlink CSIT. Feedback overheads of user equipment can be reduced by using the technical solution provided in this embodiment of the present invention.

In the several embodiments provided in this application, it should be understood that the disclosed device and method may be implemented in other manners. For example, the described device embodiment is merely exemplary. For example, the unit or module division is merely logical function division and may be other division in actual implementation. For example, multiple units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on multiple network units. Some or all of the modules may be selected according to actual needs to achieve the objectives of the solutions in the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A channel measurement method, the method comprising:
sending, by a channel measurement apparatus, an antenna domain training sequence to at least two user equipments;
receiving, by the channel measurement apparatus, channel response measurement sequences sent by the at least two user equipments, wherein the channel response measurement sequences are sequences obtained after the antenna domain training sequence passes through channels and received by the at least two user equipments;
transforming, by the channel measurement apparatus, the antenna domain training sequence to obtain an angular domain training sequence;
performing, by the channel measurement apparatus, processing on a channel response measurement sequence of each user equipment according to a sparsity set and the angular domain training sequence, to obtain a shared channel support set and a first residue of each user equipment, wherein the first residue is a residue obtained after a measurement value component generated for a channel response in the shared channel support set is subtracted from the channel response measurement sequence;
obtaining, by the channel measurement apparatus, a channel support set of each user equipment according to the angular domain training sequence, the shared channel support set, the first residue of each user equipment, and the sparsity set;
obtaining, by the channel measurement apparatus, an angular domain channel state matrix of each user equipment according to the channel support set of each user equipment, the angular domain training sequence, and the received channel response measurement sequence of each user equipment; and
transforming, by the channel measurement apparatus, the angular domain channel state matrix of each user equipment to obtain downlink channel state information (CSI).

2. The method according to claim 1, wherein performing, by the channel measurement apparatus, processing on the channel response measurement sequence of each user equipment according to the sparsity set and the angular domain training sequence, to obtain the shared channel support set and the first residue of each user equipment, comprises:
initializing, by the channel measurement apparatus, the shared channel support set and the first residue of each user equipment; and
repeatedly executing, by the channel measurement apparatus, the following steps until a quantity of repeated operation times reaches a preset first threshold:
estimating, by the channel measurement apparatus, a first angular domain channel response of each user equipment according to the first residue of each user equipment, the shared channel support set, and the sparsity set, and selecting, from the first angular domain channel response of the corresponding user equipment, an index value that is of a non-zero column and expected by the user equipment, to obtain an estimated shared channel support set of the user equipment;
adding, by the channel measurement apparatus, an index value with a highest occurrence frequency in the estimated shared channel support set of each user equipment to the shared channel support set; and obtaining, by the channel measurement apparatus, the first residue of the user equipment according to the channel response measurement sequence of each user equipment, the angular domain training sequence, and the shared channel support set.

3. The method according to claim 2, wherein obtaining, by the channel measurement apparatus, the channel support set of each user equipment according to the angular domain training sequence, the shared channel support set, the first residue of each user equipment, and the sparsity set, comprises:

initializing, by the channel measurement apparatus, the channel support set of each user equipment and a second residue of each user equipment, wherein the second residue is a residue obtained after a measurement value component generated for a channel response in the channel support set is subtracted; and repeatedly executing, by the channel measurement apparatus, the following steps until the second residue of the user equipment reaches a preset value or a quantity of repeated operation times reaches a preset second threshold:

estimating, by the channel measurement apparatus according to the second residue of the user equipment, a second angular domain channel response of the user equipment, selecting, from the second angular domain channel response, an index value that is of a non-zero column and expected by the user equipment, and adding the index value that is of the non-zero column and expected by the user equipment to the channel support set of the user equipment; and obtaining, by the channel measurement apparatus, the second residue of the user equipment according to the received channel response measurement sequence of the user equipment, the angular domain training sequence, and the channel support set of the user equipment.

4. The method according to claim 3, wherein obtaining, by the channel measurement apparatus, the angular domain channel state matrix of each user equipment according to the channel support set of each user equipment, the angular domain training sequence, and the received channel response measurement sequence of each user equipment, comprises:

obtaining, by the channel measurement apparatus, a value of a non-zero column in the angular domain channel state matrix of each user equipment according to the channel support set of each user equipment, the angular domain training sequence, and the received channel response measurement sequence of each user equipment; and setting, by the channel measurement apparatus, a value of a column in the angular domain channel state matrix of each user equipment except the non-zero column to 0 according to a quantity of transmit antennas, to obtain the angular domain channel state matrix of each user equipment.

5. The method according to claim 4, wherein estimating, by the channel measurement apparatus, the first angular domain channel response of each user equipment according to the first residue of each user equipment, the shared channel support set, and the sparsity set, and selecting, from the first angular domain channel response of the corresponding user equipment, an index value that is of a non-zero column and expected by the user equipment, to obtain an estimated shared channel support set of the user equipment, comprises:

obtaining, by the channel measurement apparatus, the estimated shared channel support set of the user equipment according to $\Omega_i = \arg\max\{\{\|(\overline{X}_\Omega)^H R_i\|_F\}, \{|\Omega| = s_i - |\Omega_c^e|\}\}$; wherein $\Omega_i$ indicates an estimated shared channel support set of the ith user equipment, $\overline{X}_\Omega$ indicates a submatrix that comprises a column vector, in the angular domain training sequence, whose index value belongs to a set $\Omega$, $R_i$ indicates a first residue of the ith user equipment, $(\overline{X}_\Omega)^H R_i$ indicates a first angular domain channel response of the ith user equipment, $|\Omega|$ indicates a quantity of elements in the set $\Omega$, $s_i$ indicates a quantity of non-zero columns in an angular domain channel state matrix of the ith user equipment, $\Omega_c^e$ indicates the shared channel support set, $|\Omega_c^e|$ indicates a quantity of elements in the shared channel support set, and $\|(\overline{X}_\Omega)^H R_i\|_F$ indicates a Frobenius norm of $(\overline{X}_\Omega)^H R_i$.

6. The method according to claim 5, wherein adding, by the channel measurement apparatus, an index value with a highest occurrence frequency in the estimated shared channel support set of each user equipment to the shared channel support set, comprises:

adding, by the channel measurement apparatus, the index value with the highest occurrence frequency in the estimated shared channel support set of each user equipment to the shared channel support set according to $$\Omega_c^e = \Omega_c^e \cup \left\{ j = \operatorname{argmax}\left\{ \sum_{i=1}^K I_{\{j \in \Omega_i\}} \right\} \right\}, \quad I_{\{j \in \Omega_i\}} = \begin{cases} 1 & j \in \Omega_i \\ 0 & j \notin \Omega_i \end{cases};$$

wherein j indicates the index value with the highest occurrence frequency in the estimated shared channel support set of each user equipment, $\Omega_c^e$ indicates the shared channel support set, K indicates a total quantity of at least two user equipments, and $\Omega_i$ indicates the estimated shared channel support set of the ith user equipment.

7. The method according to claim 6, wherein obtaining, by the channel measurement apparatus, the first residue of the user equipment according to the channel response measurement sequence of each user equipment, the angular domain training sequence, and the shared channel support set, comprises:

obtaining, by the channel measurement apparatus, the first residue of the user equipment according to $R_i = (I - \overline{X}_{\Omega_c^e})(\overline{X}_{\Omega_c^e})^+ \overline{Y}_i$; wherein $R_i$ indicates the first residue of the ith user equipment, I indicates an identity matrix, $\Omega_c^e$ indicates the shared channel support set, $\overline{X}_{\Omega_c^e}$ indicates a submatrix that comprises a column vector, in the angular domain training sequence, whose index value belongs to the shared) channel support set $\Omega_c^e$, $(\overline{X}_{\Omega_c^e})^+$ indicates a pseudo-inverse of $\overline{X}_{\Omega_c^e}$, $\overline{Y}_i = Y_i^H$, $Y_i$ indicates and the received channel response measurement sequence of each user equipment.

8. The method according to claim 7, wherein estimating, by the channel measurement apparatus, the second angular domain channel response of the user equipment according to the second residue of the user equipment, selecting, from the second angular domain channel response, an index value that is of a non-zero column and expected by the user equipment, and adding the index value that is of the non-zero column and expected by the user equipment to the channel support set of the user equipment, comprises:

adding, by the channel measurement apparatus, the index value that is of the non-zero column and expected by the user equipment to the channel support set of the user equipment according to $\Omega_i^e = \Omega_i^e \cup \{\arg\max\{\|(\overline{X}(k))^H R_i\|_F\}\}$; wherein $\Omega_i^e$ indicates a channel support set of the ith user equipment, $\overline{X}(k)$ indicates the kth column in the angular domain training sequence, $R_i$ indicates a second residue of the ith user equipment, $\overline{X}(k)^H R_i$ indicates a second angular domain channel response of the ith user equipment, and $\|(\overline{X}(k))^H R_i\|_F$ indicates a Frobenius norm of $(\overline{X}_\Omega)^H R_i$.

9. The method according to claim 8, wherein obtaining, by the channel measurement apparatus, the second residue of the user equipment according to the received channel response measurement sequence of the user equipment, the angular domain training sequence, and the channel support set of the user equipment, comprises:

obtaining, by the channel measurement apparatus, the second residue of the user equipment according to $R_i = (I - \overline{X}_{\Omega_i^e})(\overline{X}_{\Omega_i^e})^+ \overline{Y}_i$; wherein $R_i$ indicates the second residue of the ith user equipment, I indicates an identity matrix, $\Omega_i^e$ indicates the channel support set of the ith user equipment, $\overline{X}_{\Omega_i^e}$ indicates a submatrix that comprises a column vector, in the angular domain training sequence, whose index value belongs to the channel support set $\Omega_i^e$, $(\overline{X}_{\Omega_i^e})^+$ indicates a pseudo-inverse of $\overline{X}_{\Omega_i^e}$, $\overline{Y}_i = Y_i^H$, and $Y_i$ indicates the received channel response measurement sequence of each user equipment.

10. The method according to claim 9, wherein obtaining, by the channel measurement apparatus, the value of the non-zero column in the angular domain channel state matrix of each user equipment according to the channel support set of each user equipment, the angular domain training sequence, and the received channel response measurement sequence of each user equipment, comprises:

obtaining, by the channel measurement apparatus, the angular domain channel state matrix of each user equipment according to $(\overline{H_i^e})^{\Omega_i^e} = (\overline{X}_{\Omega_i^e})^+ \overline{Y}_i$; wherein $(\overline{H_i^e})^{\Omega_i^e}$ indicates the value of the non-zero column in the angular domain channel state matrix of each user equipment, $\Omega_i^e$ indicates the channel support set of the ith user equipment, $\overline{H_i^e}$ indicates the angular domain channel state matrix of each user equipment, $\overline{X}_{\Omega_i^e}$, indicates the submatrix that comprises the column vector, in the angular domain training sequence, whose index value belongs to the channel support set $\Omega_i^e$, $(\overline{X}_{\Omega_i^e})^+$ indicates a pseudo-inverse of $\overline{X}_{\Omega_i^e}$, $\overline{Y}_i = Y_i^H$, and $Y_i$ indicates the received channel response measurement sequence of each user equipment.

11. A channel measurement apparatus, comprising:

a transmitter, configured to send an antenna domain training sequence to at least two user equipments;

a receiver, configured to receive channel response measurement sequences sent by the at least two user equipments, wherein the channel response measurement sequences are sequences obtained after the antenna domain training sequence passes through channels and received by the at least two user equipments; and a processor, configured to:

transform the antenna domain training sequence to obtain an angular domain training sequence, perform processing, on a channel response measurement sequence of each user equipment according to a sparsity set and an angular domain training sequence, to obtain a shared channel support set and a first residue of each user equipment, wherein the first residue is a residue obtained after a measurement value component generated for a channel response in the shared channel support set is subtracted from the channel response measurement sequence, obtain a channel support set of each user equipment according, to the angular domain training sequence, the shared channel support set, the first residue of each user equipment, and the sparsity set, obtain the angular domain channel state matrix of each user equipment according to the channel support set of each user equipment, the angular domain training sequence, and the received channel response measurement sequence of each user equipment, and transform the angular domain channel state matrix of each user equipment to obtain downlink channel state information (CSI).

12. The channel measurement apparatus according to claim 11, wherein the processor is configured to:

initialize the shared channel support set and the first residue of each user equipment; and repeatedly execute the following steps until a quantity of repeated operation times reaches a preset first threshold:

estimate a first angular domain channel response of each user equipment according to the first residue of each user equipment, the shared channel support set, and the sparsity set, and selecting, from the first angular domain channel response of the corresponding user equipment, an index value that is of a non-zero column and expected by the user equipment, to obtain an estimated shared channel support set of the user equipment;

add an index value with a highest occurrence frequency in the estimated shared channel support set of each user equipment to the shared channel support set; and obtain the first residue of the user equipment according to the channel response measurement sequence of each user equipment, the angular domain training sequence, and the shared channel support set.

13. The channel measurement apparatus according to claim 11, wherein the processor is configured to:

initialize the channel support set of each user equipment and a second residue of each user equipment, wherein the second residue is a residue obtained after a measurement value component generated for a channel response in the channel support set is subtracted; and repeatedly execute the following steps until the second residue of the user equipment reaches a preset value or a quantity of repeated operation times reaches a preset second threshold:

after estimating a second angular domain channel response of the user equipment and selecting, from the second angular domain channel response, an index value that is of a non-zero column and expected by the user equipment, add the index value that is of the non-zero column and expected by the user equipment to the channel support set of the user equipment according to the second residue of the user equipment; and obtain the second residue of the user equipment according to the received channel response measurement sequence of the user equipment, the angular domain training sequence, and the channel support set of the user equipment, wherein the second residue is a residue obtained after a measurement value component generated for a channel response in the channel support set of the user equipment is subtracted.

14. The channel measurement apparatus according to claim 13, wherein the processor is configured to:

obtain a value of a non-zero column in the angular domain channel state matrix of each user equipment according to the channel support set of each user equipment, the angular domain training sequence, and the received channel response measurement sequence of each user equipment; and set a value in the angular domain channel state matrix of each user equipment except the non-zero column to 0 according to the quantity of transmit antennas, to obtain the angular domain channel state matrix of each user equipment.

15. The channel measurement apparatus according to claim 14, wherein the processor is configured to:

obtain the estimated shared channel support set of the user equipment according to $\Omega_i = \arg\max\{\{\|(\overline{X}_\Omega)^H R_i\|_F\}, \{|\Omega|=s_i-|\Omega_c^e|\}\}$; wherein $\Omega_i$ indicates an estimated shared channel support set of the ith user equipment, $\overline{X}_\Omega$ indicates a submatrix that comprises a column vector, in the angular domain training sequence, whose index value belongs to a set $\Omega$, $R_i$ indicates a first residue of the ith user equipment, $(\overline{X}_\Omega)^H R_i$ indicates a first angular domain channel response of the ith user equipment, $|\Omega|$ indicates a quantity of elements in the set $\Omega$, $s_i$ indicates a quantity of non-zero columns in an angular domain channel state matrix of the ith user equipment, $\Omega_c^e$ indicates the shared channel support set, $|\Omega_c^e|$ indicates a quantity of elements in the shared channel support set, and $\|(\overline{X}_\Omega)^H R_i\|_F$ indicates a Frobenius norm of $(\overline{X}_\Omega)^H R_i$.

16. The channel measurement apparatus according to claim 15, wherein the processor is configured to:

add the index value with the highest occurrence frequency in the estimated shared channel support set of each user equipment to the shared channel support set according to $$\Omega_c^e = \Omega_c^e \cup \left\{ j = \text{argmax}\left\{ \sum_{i=1}^K I_{[j \in \Omega_i]} \right\} \right\}, I_{[j \in \Omega_i]} = \begin{cases} 1 & j \in \Omega_i \\ 0 & j \notin \Omega_i \end{cases};$$

wherein j indicates the index value with the highest occurrence frequency in the estimated shared channel support set of each user equipment, $\Omega_c^e$ indicates the shared channel support set, K indicates a total quantity of at least two user equipments, and $\Omega_i$ indicates the estimated shared channel support set of the ith user equipment.

17. The channel measurement apparatus according to claim 16, wherein the processor is configured to:

obtain the first residue of the user equipment according to $R_i = (I - \overline{X}_{\Omega_c^e})(\overline{X}_{\Omega_c^e})^+ \overline{Y}_i$; wherein $R_i$ indicates the first residue of the ith user equipment, I indicates an identity matrix, $\Omega_c^e$ indicates the shared channel support set, $\overline{X}_{\Omega_c^e}$ indicates a submatrix that comprises a column vector, in the angular domain training sequence, whose index value belongs to the shared channel support set $\Omega_c^e$, $(\overline{X}_{\Omega_c^e})^+$ indicates a pseudo-inverse of $\overline{X}_{\Omega_c^e}$, $\overline{Y}_i = Y_i^H$, and $\overline{Y}_i$ indicates the received channel response measurement sequence of each user equipment.

18. The channel measurement apparatus according to claim 17, wherein the processor is configured to:

add the index value that is of the non-zero column and expected by the user equipment to the channel support set of the user equipment according to $\Omega_i^e = \Omega_i^e \cup \{\arg\max\{\|(\overline{X}(k))^H R_i\|_F\}\}$; wherein $\Omega_i^e$ indicates a channel support set of the ith user equipment, $\overline{X}(k)$ indicates the kth column in the angular domain training sequence, $R_i$ indicates a residue of the ith user equipment, $\overline{X}(k)^H R_i$ indicates a second angular domain channel response of the ith user equipment, and $\|(\overline{X}(k))^H R_i\|_F$ indicates a Frobenius norm of $(\overline{X}_\Omega)^H R_i$.

19. The channel measurement apparatus according to claim 18, wherein the processor is configured to:

obtain the second residue of the user equipment according to $R_i = (I - \overline{X}_{\Omega_i^e})(\overline{X}_{\Omega_i^e})^+ \overline{Y}_i$; wherein $R_i$ indicates the second residue of the ith user equipment, I indicates an identity matrix, $\Omega_i^e$ indicates the channel support set of the ith user equipment, $\overline{X}_{\Omega_i^e}$ indicates a submatrix that comprises a column vector, in the angular domain training sequence, whose index value belongs to the channel support set $\Omega_i^e$, $(\overline{X}_{\Omega_i^e})^+$ indicates a pseudo-inverse of $\overline{X}_{\Omega_i^e}$, $\overline{Y}_i = Y_i^H$, and $\overline{Y}_i$ indicates the received channel response measurement sequence of each user equipment.

20. The channel measurement apparatus according to claim 19, wherein the processor is configured to:

obtain the angular domain channel state matrix of each user equipment according to $(\overline{H_i^e})^{\Omega_i^e} = (\overline{X}_{\Omega_i^e})^+ \overline{Y}_i$; wherein $(\overline{H_i^e})^{\Omega_i^e}$ indicates the value of the non-zero column in the angular domain channel state matrix of each user equipment, $\Omega_i^e$ indicates the channel support set of the ith user equipment, $\overline{H_i^e}$ indicates the angular domain channel state matrix of each user equipment, $\overline{X}_{\Omega_i^e}$ indicates the submatrix that comprises the column vector, in the angular domain training sequence, whose) index value belongs to the channel support set $\Omega_i^e$, $(\overline{X}_{\Omega_i^e})^+$ indicates a pseudo-inverse of $\overline{X}_{\Omega_i^e}$, $\overline{Y}_i = Y_i^H$, and $\overline{Y}_i$ indicates the received channel response measurement sequence of each user equipment.

* * * * *